US008887999B2

(12) United States Patent
Wolfe et al.

(10) Patent No.: US 8,887,999 B2
(45) Date of Patent: *Nov. 18, 2014

(54) SYSTEM AND METHOD FOR CONVERTING CLOSED LOOP CARDS INTO GIFT CODES

(75) Inventors: Jason Wolfe, Sewickley, PA (US); Mark Romanelli, Bridgeville, PA (US); Sanjay Akut, Pittsburgh, PA (US); Mike Kelly, Langhorne, PA (US); Mary Jane Kelly, Langhorne, PA (US)

(73) Assignee: GiftCodes.com, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/702,623

(22) Filed: Feb. 9, 2010

(65) Prior Publication Data

US 2010/0200655 A1    Aug. 12, 2010

Related U.S. Application Data

(63) Continuation-in-part of application No. 12/573,060, filed on Oct. 2, 2009.

(60) Provisional application No. 61/207,125, filed on Feb. 9, 2009, provisional application No. 61/211,394, filed on Mar. 28, 2009.

(51) Int. Cl.
*G06K 5/00* (2006.01)
*G07F 19/00* (2006.01)
*G06F 7/08* (2006.01)
*G06Q 30/02* (2012.01)

(52) U.S. Cl.
CPC .................................. *G06Q 30/02* (2013.01)
USPC ............................ 235/380; 235/379; 235/381

(58) Field of Classification Search
USPC ............ 235/375, 379–381, 383; 705/14, 14.1
See application file for complete search history.

(56) References Cited

U.S. PATENT DOCUMENTS 7,494,048 B2    2/2009  Gusler et al.
7,624,921 B1 *  12/2009 Beck et al. .................... 235/380

(Continued)

FOREIGN PATENT DOCUMENTS

WO    WO 2008/013945    1/2008

OTHER PUBLICATIONS

Offenberg, "Markets: Gift Cards"; Journal of Economic Perspectives. vol. 21, No. 2, Spring 2007 [Retrieved from the Internet] <URL:http://myweb.lmu.edu/jpate/JEP_2007.pdf>, pp. 227-238.

(Continued)

*Primary Examiner* — Thien M Le
*Assistant Examiner* — April Taylor

(57) ABSTRACT

Disclosed herein are systems, methods, and computer-readable storage media for generating a gift code. The system receives an indication from a first user identifying a closed loop card, receives a confirmation of an amount of money in an account associated with the closed loop card, offers to purchase the closed loop card at an amount less than the amount of money in the account associated with the closed loop card, and upon acceptance of the offer, deactivates the closed loop card. The system then offers to sell the amount of money at a discount rate to a second user, receives acceptance of the offer to sell the amount of money at the discount rate, and associates a gift code with the amount of money for use by the second user. Gift codes can have no expiration date. A multi-process secure gateway can confirm the amount of money.

26 Claims, 4 Drawing Sheets

(56) References Cited

U.S. PATENT DOCUMENTS

| | | | |
|---|---|---|---|
| 8,152,060 B2 | 4/2012 | Wolfe et al. | |
| 8,152,061 B2 | 4/2012 | Wolfe et al. | |
| 8,229,851 B2 | 7/2012 | Doran et al. | |
| 8,528,814 B2 | 9/2013 | Wolfe | |
| 2002/0065713 A1 | 5/2002 | Awada et al. | |
| 2003/0004828 A1* | 1/2003 | Epstein | 705/26 |
| 2004/0219971 A1* | 11/2004 | Ciancio et al. | 463/25 |
| 2005/0171902 A1 | 8/2005 | Nguyen | |
| 2005/0228717 A1* | 10/2005 | Gusler et al. | 705/14 |
| 2006/0037835 A1* | 2/2006 | Doran et al. | 194/302 |
| 2006/0190337 A1 | 8/2006 | Ayers et al. | |
| 2007/0205269 A1* | 9/2007 | Lindon | 235/380 |
| 2007/0272736 A1* | 11/2007 | Brooks et al. | 235/379 |
| 2008/0027810 A1 | 1/2008 | Lerner et al. | |
| 2008/0162271 A1 | 7/2008 | Benjamin | |
| 2008/0162299 A1* | 7/2008 | Gusler et al. | 705/26 |
| 2008/0296368 A1 | 12/2008 | Newsom | |
| 2009/0074167 A1 | 3/2009 | Evans et al. | |
| 2009/0171773 A1* | 7/2009 | Shastry | 705/14 |
| 2009/0265269 A1* | 10/2009 | Stoecker | 705/39 |
| 2010/0010888 A1 | 1/2010 | Maertz | |
| 2010/0057580 A1* | 3/2010 | Raghunathan | 705/17 |
| 2010/0070290 A1* | 3/2010 | Marturana et al. | 705/1 |
| 2010/0076833 A1 | 3/2010 | Nelsen | |
| 2010/0280921 A1* | 11/2010 | Stone et al. | 705/27 |
| 2010/0299194 A1 | 11/2010 | Snyder et al. | |
| 2011/0106698 A1 | 5/2011 | Isaacson et al. | |
| 2011/0178862 A1 | 7/2011 | Daigle | |
| 2011/0178924 A1 | 7/2011 | Briscoe et al. | |
| 2011/0213674 A2 | 9/2011 | Shpun et al. | |
| 2011/0288978 A1 | 11/2011 | Abifaker | |
| 2012/0016725 A1* | 1/2012 | Kraft et al. | 705/14.11 |
| 2012/0246019 A1 | 9/2012 | Wolfe | |
| 2013/0197986 A1* | 8/2013 | Roberts et al. | 705/14.27 |
| 2013/0204681 A1 | 8/2013 | Kraft et al. | |
| 2013/0284805 A1* | 10/2013 | Kraft et al. | 235/381 |
| 2014/0012640 A1* | 1/2014 | Roberts et al. | 705/14.3 |
| 2014/0058934 A1* | 2/2014 | Smith et al. | 705/40 |

OTHER PUBLICATIONS

Swapagift.com Expands its "Cash for Your Card" program. Retrieved from http://www.prweb.com/releases/2003/12/prweb96305.htm on Nov. 9, 2011.

Swapathing, Inc. Announces the Internet's First Online Gift Card Exchange. Retrieved from http://www.prweb.com/releases/2003/10/prweb83758.htm on Nov. 9, 2011.

Cash for your card now! Retrieved from www.swapagift.com on Nov. 9, 2011.

"What is SwapAGift.com?" retrieved from http://www.swapagift.com/ on Oct. 25, 2011.

U.S. Appl. No. 13/668,923, filed Nov. 5, 2012, Jason Wolfe.

U.S. Appl. No. 13/668,971, filed Nov. 5, 2012, Jason Wolfe.

* cited by examiner

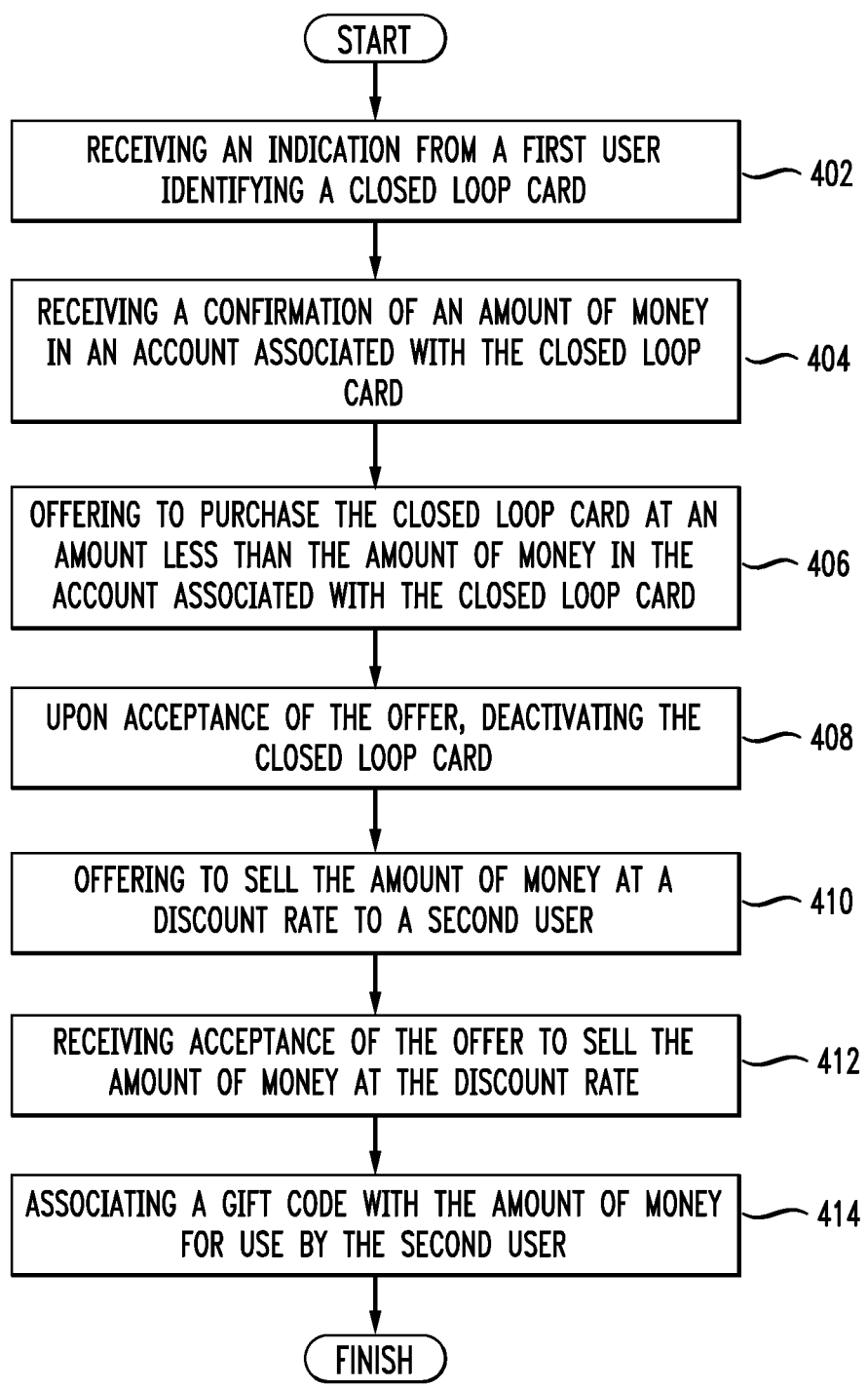

SYSTEM AND METHOD FOR CONVERTING CLOSED LOOP CARDS INTO GIFT CODES

PRIORITY CLAIM

The present application is a continuation-in-part of U.S. application Ser. No. 12/573,060, filed Oct. 2, 2009, which claims priority to Provisional Application 61/207,125, filed Feb. 9, 2009, and Provisional Application 61/211,394, filed Mar. 28, 2009, all of which are herein incorporated by reference.

RELATED APPLICATIONS

This Application is related to U.S. application Ser. Nos. 12/702,600, 12/702,610 and 12/701,711, filed the same day as this Application.

BACKGROUND

1. Technical Field

The present disclosure relates to processing closed loop cards and more specifically to converting or transferring funds on closed loop cards to gift codes usable at multiple merchants.

2. Introduction

Gift cards are widely used as gifts for birthdays, Christmas, and other holidays. Gift cards are closed loop cards, meaning that the value represented by a gift card is a valid form of payment at a closed set of retailers. For example, an Outback Steakhouse® gift card is only redeemable at Outback Steakhouse® and not at Planet Hollywood® or Target®. Some closed loop cards are valid at a family of closely related or commonly owned merchants. For example, a Darden Restaurants gift card is valid at Red Lobster® and Olive Garden®, or a local mall gift card is valid at tenant merchants in the local mall. Open loop cards, in contrast, are a valid form of payment at virtually every retailer nationwide, such as Visa® or Mastercard® debit cards.

While gift cards are a popular alternative to giving cash or a merchandise item which the recipient may not like, the recipient may not be able to redeem the gift card due to geographic limitations, personal disinterest in the merchant who issued the gift card, or other reasons. Additionally, some merchants issue gift cards with significant restrictions, complex fees, and/or an expiration date. According to one estimate, consumers purchase about $80 billion worth of gift cards annually in the U.S. and roughly 10%, or $8 billion, of that amount goes unredeemed. Consumers waste these unredeemed funds and do not benefit from the full value of the gift card. Further, if these funds are not spent, they can escheat to the state.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for generating a gift code. A system performing the method first receives an indication from a first user identifying a closed loop card, receives a confirmation of an amount of money in an account associated with the closed loop card, and offers to purchase the closed loop card at an amount less than the amount of money in the account associated with the closed loop card. The information identifying the closed loop card can be read from a physical closed loop card. The offer amount can be based on a resale velocity of cards of a similar type as the closed loop card. The system can then receive the physical closed loop card for recycling or destruction. Upon acceptance of the offer, the system deactivates the closed loop card and offers to sell the amount of money at a discount rate to a second user. The system then receives acceptance of the offer to sell the amount of money at the discount rate and associates a gift code with the amount of money for use by the second user. The gift code can have no expiration date. A multi-process secure gateway which communicates with one or more closed loop card processors can provide the received confirmation of the amount of money. The system can provide the funded gift code to the second user.

In one aspect, the system further determines a set of smaller values totaling a sum equal to the amount of money in the closed loop card account, divides the amount of money in the closed loop account into gift codes in denominations of the set of smaller values, and offers to sell the smaller value gift codes at discount rates. When the second user uses the gift code, the system causes the transfer of the amount of money to another account.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
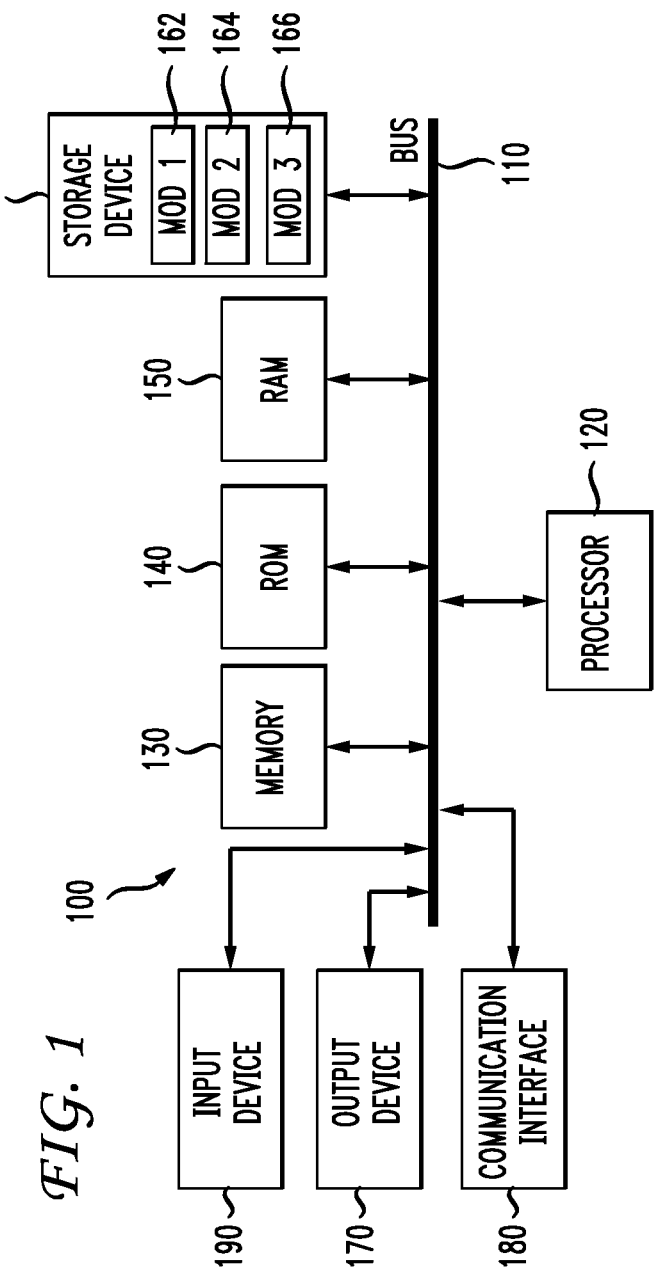
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Gift cards are divided into open loop and closed loop cards. Typically banks or credit card companies issue open loop cards which can be redeemed by virtually any business entity. These differ from closed loop cards which are typically issued by a specific store or restaurant and can be only redeemed by the issuing provider. Gift cards are one common form of closed loop cards. Retailer-specific gift codes are another form of virtual closed loop cards. The physical card and the card number associated with the card are interchangeable concepts. Gift cards can store a reference to the amount of money within a physical card or can store a reference to an external database of accounts which references an amount of money. One or more external database can maintain funds from which each of a set of accounts linked to a card can draw.

Figure 2:
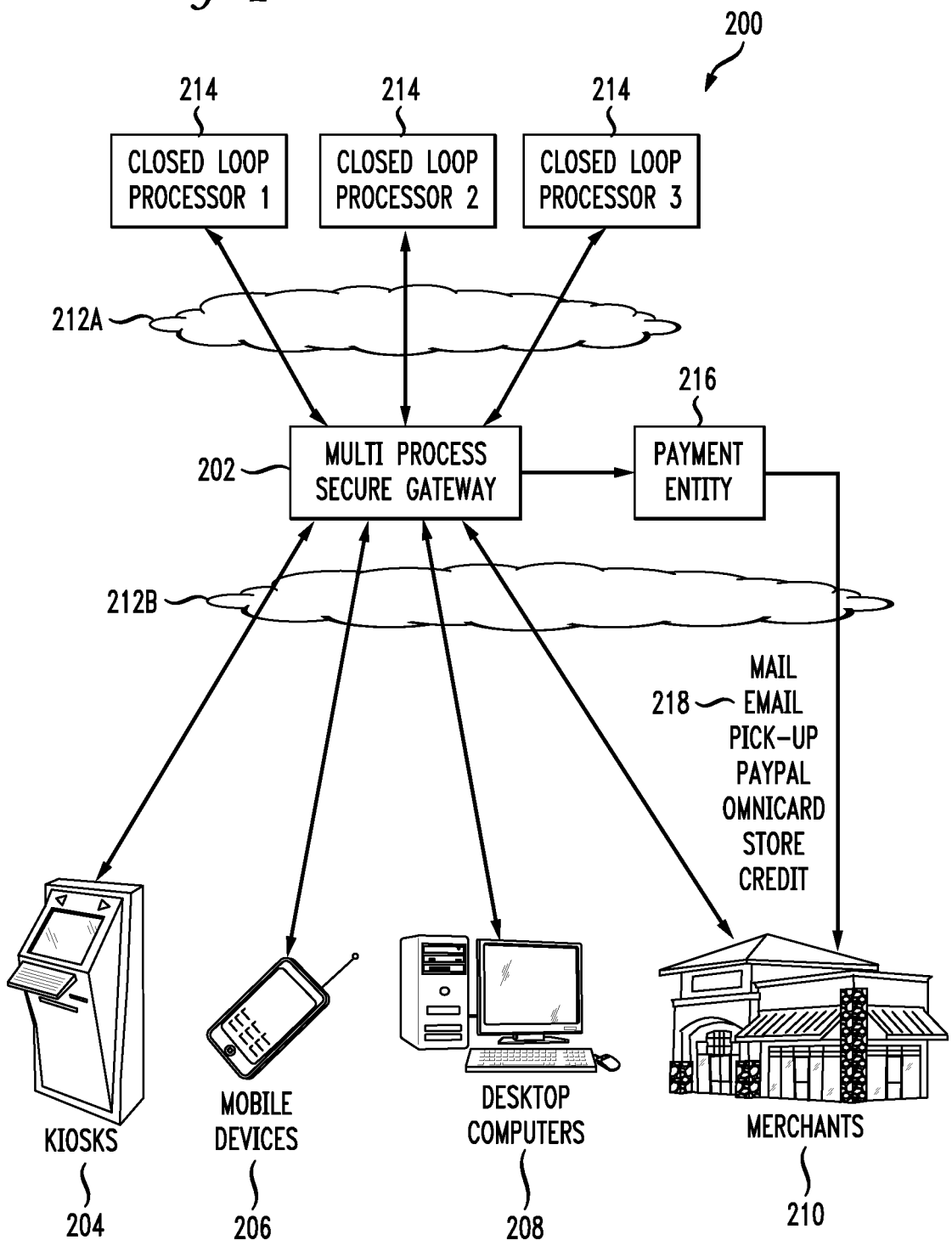
FIG. 2 illustrates a multi-process secure gateway configuration.

Having disclosed some basic system components and concepts, the disclosure now turns to the exemplary method embodiment shown in FIG. 2. For the sake of clarity, the method is discussed in terms of an exemplary system such as is shown in FIG. 1 configured to practice the method.

FIG. 2 illustrates a multi-process secure gateway configuration 200. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B such as the public telephone network or the Internet. The multi-process secure gateway 202 interacts with various requesters, such as kiosks 204, mobile devices 206, desktop computers 208, and merchants' point of sale devices 210, which submit information uniquely identifying closed loop cards. Mobile device 206 can also represent a standard telephone as well as communication with an interactive voice response system. Each of these devices can interact with the secure gateway 202 through different protocols, such as a direct network connection, an HTTP-based portal, SMS messages, telephone, interactive voice response systems, point-of-sale (POS) terminals, etc. In the case of merchants, each point of sale of the merchant 210 can connect to a centralized merchant server, not shown, which relays requests to the secure gateway 202 on behalf of all the merchant 210 point of sale devices. Other configurations also exist. In one aspect, this process may be called, "Cash4Card" (this name is used for description purposes only). Merchants 210, kiosks 204, other devices and/or locations, including online storefronts, which provide an interface to the secure gateway 202 can provide an easily recognizable visual or other indication readily indicating to potential customers that they accept gift cards under the Cash4Card program. The indication can be a window sticker, an online image, or other sign displayed in a manner similar to the well-known overlapping circles for MasterCard® or the blue and orange bars over and under the word VISA®.

The secure gateway 202 interacts with multiple closed loop processors 214, such as FirstData and Chase Paymentech, over a network 212A such as the Internet. These closed loop processors are entities that process closed loop cards, such as FirstData, and are different from a computer processor such as an AMD Phenom II or Intel Core Duo. The secure gateway 202 can perform any action on the closed loop card through the various closed loop card processors 214 as if the secure gateway 202 was a closed loop merchant. The secure gateway 202 analyzes the submitted information to determine which closed loop processor handles that type of closed loop card. For example, a particular series of numbers or letters can indicate that one closed loop card is honored by Paymentech, and another distinct set of numbers or letters indicates that another closed loop card is honored by FirstData. The logic and analysis in the secure gateway 202 can change from time to time as new types of cards are issued by existing closed loop processors 214 or as the secure gateway 202 adds interfaces for new closed loop processors. The secure gateway 202 can include a common application programmer interface (API) which defines actions which may be performed through the closed loop processors 214. The API translates API calls to the corresponding specific sets of proprietary interactions with the various closed loop processors 214, which may be very different between closed loop processors 214.

The secure gateway 202 determines the balance of the closed loop card from the closed loop processor 214 and offers to purchase the closed loop card from the requestor, typically at a price lower than the amount on the card. If the requestor provides an indication of agreement to sell the closed loop card, then the secure gateway deactivates the closed loop card associated with the submitted information, issues a new closed loop card in that amount (which may be a physical closed loop card or a virtual closed loop card), and pays the purchase price to the requestor through a payment entity 216. Deactivation and issuance of a new card can occur via the processes set forth in incorporated application Ser. No. 12/573,042. The payment entity 216 may be a merchant that pays the requestor and then another entity settles with the merchant. The gateway 202 can also provide instructions to other entities to perform the deactivation, issuance, payment, and other steps. The payment entity 216 can be part of the secure gateway 202, part of a merchant point of sale equipment 210, or a separate entity altogether. The secure gateway 202 can provide additional instructions regarding how to transfer payment 218 to the requestor. Some examples of how to transfer payment include mailing a physical open loop card to the requestor, emailing to the requestor the necessary information to use a non-physical open loop card (such as an account number and PIN), notifying a local financial service to prepare an amount of money for pickup (such as MoneyGram or Western Union), transferring funds to an electronic account (such as PayPal), transferring money to a requestor's existing open loop card (such as an OmniCard or other debit card), or granting store credit to the requestor. The payment entity 216 can also provide payment to the requestor using other suitable approaches.

Figure 3:
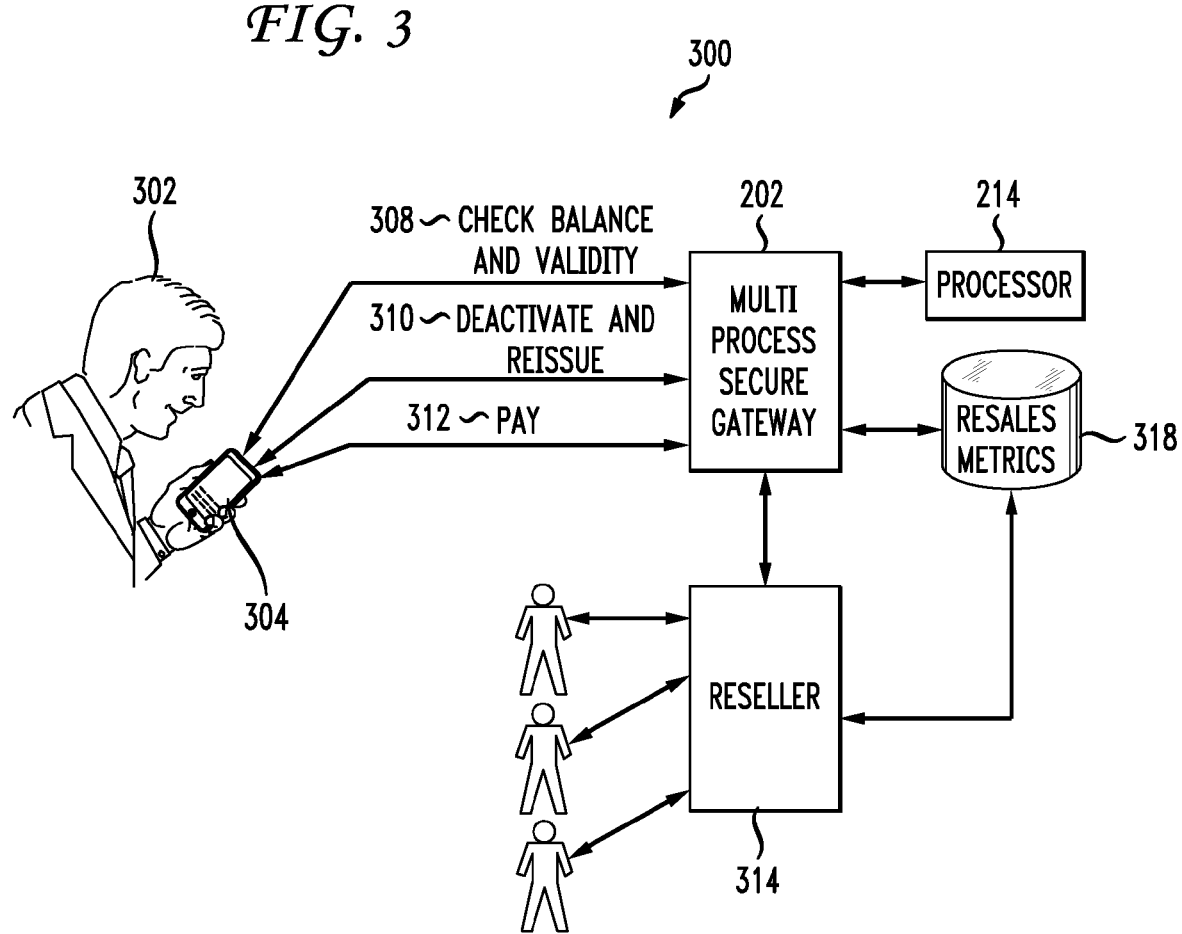
FIG. 3 illustrates user interactions with a secure gateway and a reseller.

FIG. 3 illustrates user interactions with a secure gateway 202 as shown in FIG. 2 and a reseller 314. The user 302, through a network-enabled device 304, transmits a request to the multi-process secure gateway 202 to check the balance and validity of an identified closed loop card 308. As shown in FIG. 2, the secure gateway 202 communicates with the appropriate closed loop processor 214 and returns the balance to the secure gateway 202. The secure gateway 202 makes a purchase price determination based on resales metrics 318 of that particular type of card. Resales metrics can include how fast inventory of a particular type of closed loop card is resold, how much inventory is currently held, desired profit margins, operating expenses, fees to transfer or create new closed loop cards, etc. The secure gateway 202 offers to purchase the closed loop card from the user 302 for the determined purchase price. If the user accepts, the secure gateway deactivates the closed loop card and issues a new closed loop card in the same amount 310. The new closed loop card can be a virtual closed loop card, i.e. numbers stored in a computer-readable storage medium, or an actual printed closed loop card. The secure gateway 202 then pays the user 312 the purchase price or causes another entity (not shown) to make payment to the user as discussed above.

Next, the secure gateway transfers the new closed loop card to a reseller 314. The reseller 314 can offer to sell the new closed loop card for less than its face value. For example, if the user 302 submits a $200 Sears gift card, the secure gateway 202 can determine that Sears gift cards in that denomination are in high demand and offer to purchase the $200 Sears gift card for $135. The user accepts the offer and the secure gateway 202 pays the user $135. The secure gateway 202 deactivates the $200 Sears gift card and reissues a new $200 Sears gift card which can be represented as numbers stored by the reseller 314. The reseller 314 then offers the $200 Sears gift card for sale to the general public 316 at a discount rate of $170, a 15% discount off the face value. When a customer purchases the $200 Sears gift card, the reseller 314 can convert the virtual gift card to a printed gift card on demand and mail it to the customer. In this case, the reseller earns the difference between the purchase price $135 and the discount rate $170, or $35. The reseller 314 can operate as a brick and mortar retail store, an online storefront, an online auction, or any other suitable sales outlet. In another aspect, the reseller purchases a gift card from a user at or above its face value, i.e. purchases a $100 Sears gift card for $100 or for $110. In this case, the reseller can make a profit by providing the payment for the gift card on a general purpose reloadable card run by the reseller. Then the reseller makes by interest, float, interchange, and/or monthly minimum fees.

The reseller method described herein may also be provided as a tool by another entity that franchises or receives a fee for use of the tool.

FIG. 4 illustrates an example method embodiment for generating a gift code. The method can be practiced by a properly configured system 100 as shown in FIG. 1 as embodied in gateway 202 or in another configuration such as a multi node compute environment. The system first receives an indication from a first user identifying a closed loop card (402). The card owner can swipe the closed loop card through a card reader to read information identifying the closed loop card. The card owner can also insert the card into a card reader within a kiosk in a manner similar to an Automated Teller Machine (ATM). In one aspect, a kiosk or other location which accepts and/or reads physical closed loop cards can include a recycling receptacle for collecting used cards. Such a collection device at an ATM, kiosk, or a point-of-sale (POS) terminal, can be a separate container or the device can retrieve and retain the card, storing the card internally for later recycling or destruction. The collected used cards can be recycled or destroyed. Certain closed loop card issuers may require this feature to keep deactivated or invalid cards out of circulation. The system can restrict the amount of money the owner of the closed loop card can redeem over a period of time. The system can also restrict the number of cards redeemed over a period of time. For example, the system can impose a $1,000 per month or 3 card per day limit. The system can require the card owner to create or log in to an account to redeem closed loop cards. The system can also request that card owners enter driver's license information, social security number, credit card information, and/or any other information. This information can be used to direct payment to the owner and can also be used to check that the owner is not engaged in fraud with the closed loop card.

The system receives a confirmation of an amount of money in an account associated with the closed loop card (404). The system can interact with a multi-process secure gateway as shown in FIGS. 2 and 3 which communicates with one or more closed loop card processors to verify the closed loop card's validity and the amount in the closed loop card account. The system offers to purchase the closed loop card at an amount less than the amount of money in the account associated with the closed loop card (406). For example, the system can communicate to the user that the card account has $100 and offer to purchase the closed loop card for $50 in non-closed loop funds. The offer amount can be based on a resale velocity of cards of a similar type as the closed loop card, inventory levels, and/or any other relevant business metrics.

In a "stub hub" or auction-based model, the offer to pay the offer amount is time-limited and/or conditional upon a resale of the closed loop card. The closed loop card is effectively offered up on consignment, meaning that the system provides payment to the owner of the offer amount upon resale to a third party. In this aspect, the system can deactivate or suspend the closed loop card after the owner accepts the offer and reactivate or reinstate the closed loop card after the time-limited offer expires without resale. The system can deactivate a card by simply withdrawing all the funds so that the card has a balance of $0.00. The system can notify the card owner when a sale occurs, when payment is sent, etc. The system can also notify the user that a time-limited consignment is expiring or expired. In this case, the system can present the user with the option to end the consignment, resume the consignment, accept a lower offer price to promote a speedier sale, etc. The owner can set the system to automatically renew the consignment for a number of time intervals or indefinitely.

Upon acceptance of the offer, the system deactivates the closed loop card (408) and offers to sell the amount of money at a discount rate to a second user (410). The system can determine a set of smaller values totaling a sum equal to the amount of money in the closed loop card account, divide the amount of money in the closed loop account into gift codes in denominations of the set of smaller values, and offer to sell the smaller value gift codes at discount rates. The system can also merge smaller denomination closed loop card accounts. These approaches are useful when the values of the closed loop card accounts are not easily marketable because they are too large or too small.

The system receives acceptance of the offer to sell the amount of money at the discount rate (412). The system associates a gift code with the amount of money for use by the second user (414). The gift code can be used immediately at online or brick and mortar retailers and has no expiration date. Virtually all online retailers include a field in the checkout process to enter a gift code and/or a coupon code. While some coupon codes are tied to a specific promotion, such as 20% off all Western Digital Hard Drives at newegg.com, gift codes are typically good for a specific dollar amount off any item at that particular retailer. In other words, they operate as a traditional physical closed loop card or gift card, but users or retailers enter them as a gift code instead of a payment card. When the second user uses the gift code, the system transfers the amount of money to another account.

In one specific example, the system pays the owner by adding value to an existing gift code. In another example, the system receives from the owner a set of smaller values totaling a sum equal to or lesser than the amount of money in the closed loop card account and divides the amount of money in the closed loop account into gift codes in denominations of the set of smaller values. The system provides these gift codes to the owner as payment. A concrete example of this scenario is a user who submits a $300 gift card to Best Buy, but does not want or need anything from Best Buy or does not live sufficiently close to a Best Buy. The user can sell the $300 gift card to the system for $175, and split that $175 into gift codes in varying denominations and for a variety of retailers. The user can request a $100 gift code to Target, a $50 gift code to tigerdirect.com, and a $25 gift code to Toys "51" Us. The user can then regive these gift codes to others. The user can request that the system deliver the gift codes to a third party as a gift. For example, Abe sells a closed loop card for a gift code to Wal-Mart. Abe can request that the system send the gift code to Betty, his wife, as an anniversary present. Users can request that the system hold the gift code and deliver it on a specific day to a specific person. Users can further provide a personalized message for delivery with the gift code. In one aspect, the system provides users with a management interface to edit details of held gift codes, such as cancelling the hold, delivering early, editing the personalized message, and other management functions.

The system can provide a mechanism for applying funds on an unwanted closed loop gift card toward payments of a bill (utility bill, car loan, student loan payment, cell phone bill, etc.). As an example, Tom presents a $50 Sears gift card to a Cash4Card site, which offers Tom $40 for the card. Tom elects to receive the $40 by way of entering the Third Party they wish to pay the funds to, and the Cash4Card site makes payment on Tom's behalf The Cash4Card site can then prompt Tom to enter additional information, such as an account number, invoice number, or bill number.

In another variation, the owner had a $100 closed loop gift card and purchased merchandise with it such that $32.31 remained on the gift card. The system offers to purchase the $32.31 card for $19.39. The owner wants to use the offered purchase price as a gift code, but doesn't want to give the gift code as a gift with a non-round number. The user can pay extra money in addition to the offered purchase price to obtain a gift code with the desired round number, such as an extra $0.61 to round up to $20 or an extra $5.61 to round up to $25.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving an indication from a first consumer identifying a closed loop card, wherein the first consumer is not a company;
   receiving a confirmation of an amount of money in an account associated with the closed loop card;
   presenting a first offer to purchase the closed loop card at an offer amount less than the amount of money;
   upon acceptance of the first offer, deactivating the closed loop card;
   presenting a second offer to sell the amount of money at a discount rate to a second consumer, wherein the first consumer differs from the second consumer, and wherein the second consumer is not a company;
   receiving acceptance of the second offer; and
   associating, via a processor, an electronic gift code with the amount of money for use by the second consumer, wherein the electronic gift code is redeemable at a merchant point of sale and does not represent a physical gift instrument.

2. The method of claim 1, wherein the electronic gift code has no expiration date.

3. The method of claim 1, wherein a multi-process secure gateway provides the confirmation of the amount of money.

4. The method of claim 1, wherein a multi-process secure gateway communicates with one or more closed loop card processors.

5. The method of claim 1, further comprising providing the electronic gift code to the second consumer.

6. The method of claim 1, further comprising:
   determining a set of smaller values totaling a sum equal to the amount of money in the closed loop card account;
   dividing the amount of money in the closed loop account into a plurality of electronic gift codes in denominations of the set of smaller values; and
   offering to sell each of the plurality of electronic gift codes at a respective discount rate.

7. The method of claim 1, wherein the information identifying the closed loop card is read from a physical closed loop card, the method further comprising receiving the physical closed loop card.

8. The method of claim 1, wherein the offer amount is based on a resale velocity of cards of a similar type as the closed loop card.

9. The method of claim 1, further comprising restricting a total amount of money the first consumer can redeem over a period of time.

10. The method of claim 1, wherein when the second consumer uses the electronic gift code, the method further comprising transferring the amount of money to another account.

11. The method of claim 1, wherein the electronic gift code is one of an open loop gift code and a closed loop gift code.

12. A system for processing closed loop cards, the system comprising:
   a processor; and
   a computer-readable storage medium storing instructions which, when executed by the processor, cause the processor to perform operations comprising:
   receiving an indication from a first consumer identifying a closed loop card, wherein the first consumer is not a company;

receiving a confirmation of an amount of money in an account associated with the closed loop card;

presenting a first offer to purchase the closed loop card at an offer amount less than the amount of money;

upon acceptance of the first offer, deactivating the closed loop card;

offering to sell the amount of money at a discount rate to a second consumer, wherein the first consumer differs from the second consumer, and wherein the second consumer is not a company;

receiving acceptance of the second offer; and associating an electronic gift code with the amount of money for use by the second consumer, wherein the electronic gift code is redeemable at a merchant point of sale and does not represent a physical gift instrument.

13. The system of claim 12, wherein the electronic gift code has no expiration date.

14. The system of claim 12, wherein a multi-process secure gateway provides the confirmation of the amount of money.

15. The system of claim 12, wherein a multi-process secure gateway communicates with one or more closed loop card processors.

16. The system of claim 12, wherein the electronic gift code is one of an open loop gift code and a closed loop gift code.

17. A non-transitory computer-readable storage medium storing instructions which, when executed by a computing device, control the computing device to process closed loop cards, the instructions comprising:

receiving an indication from a first consumer identifying a closed loop card, wherein the first consumer is not a company;

receiving a confirmation of an amount of money in an account associated with the closed loop card;

presenting a first offer to purchase the closed loop card at an offer amount less than the amount of money;

upon acceptance of the first offer, deactivating the closed loop card;

presenting a second offer to sell the amount of money at a discount rate to a second consumer, wherein the first consumer differs from the second consumer, and wherein the second consumer is not a company;

receiving acceptance of the second offer; and associating, via a processor, an electronic gift code with the amount of money for use by the second consumer, wherein the electronic gift code is redeemable at a merchant point of sale and does not represent a physical gift instrument.

18. The non-transitory computer-readable storage medium of claim 17, wherein the offer amount is based on a resale velocity of cards of a similar type as the closed loop card.

19. The non-transitory computer-readable storage medium of claim 17, the instructions further controlling the computing device to restrict a total amount of money the first consumer can redeem over a period of time.

20. The non-transitory computer-readable storage medium of claim 17, the instructions further controlling the computing device to check that first consumer is not engaged in fraud with the closed loop card.

21. The non-transitory computer-readable storage medium of claim 17, wherein when the second consumer uses the electronic gift code, the instructions further control the computing device to transfer the amount of money to another account.

22. The non-transitory computer readable storage medium of claim 17, wherein the electronic gift code is one of an open loop gift code and a closed loop gift code.

23. A method comprising:

receiving an indication from a first consumer identifying a first code, wherein the first code is electronic and independent of a physical gift instrument, wherein the first consumer is not a company;

receiving a confirmation of an amount of money in an account associated with the first code;

presenting a first offer to purchase the first code at an offer amount less than the amount of money;

upon acceptance of the first offer, deactivating the first code;

presenting a second offer to sell the amount of money at a discount rate to a second consumer, wherein the first consumer differs from the second consumer, and wherein the second consumer is not a company;

receiving acceptance of the second offer; and associating, via a processor, a second code with the amount of money for use by the second consumer, wherein the second code is electronic and independent of a physical gift instrument.

24. The method of claim 23, wherein the first code and the second code are each one of an open loop code and a closed loop code.

25. The method of claim 23, further comprising:

determining a set of smaller values totaling a sum equal to the amount of money in the account;

dividing the amount of money in the account into denominations of the set of smaller values each smaller valve being associated with one of a plurality of codes; and offering to sell each of the plurality of electronic gift codes at a respective discount rate.

26. The method of claim 23, wherein the first code is associated with a first company and the second code is associated with a second company.

* * * * *